US007246062B2

(12) United States Patent
Knott et al.

(10) Patent No.: US 7,246,062 B2
(45) Date of Patent: Jul. 17, 2007

(54) METHOD AND SYSTEM FOR VOICE RECOGNITION MENU NAVIGATION WITH ERROR PREVENTION AND RECOVERY

(75) Inventors: Benjamin Anthony Knott, Round Rock, TX (US); John Mills Martin, Austin, TX (US); Robert Randal Bushey, Cedar Park, TX (US); Tracy Leigh Smart, Austin, TX (US)

(73) Assignee: SBC Technology Resources, Inc., Austin, TX (US)

( * ) Notice: Subject to any disclaimer, the term of this patent is extended or adjusted under 35 U.S.C. 154(b) by 788 days.

(21) Appl. No.: 10/118,478

(22) Filed: Apr. 8, 2002

(65) Prior Publication Data

US 2003/0191648 A1     Oct. 9, 2003

(51) Int. Cl.
*G10L 15/00* (2006.01)

(52) U.S. Cl. ........................ 704/246; 704/275; 345/728
(58) Field of Classification Search ................ 704/275, 704/246; 345/728
See application file for complete search history.

(56) References Cited

U.S. PATENT DOCUMENTS

| 5,758,322 | A  | * | 5/1998 | Rongley ...................... 704/275 |
| 5,899,972 | A  |   | 5/1999 | Miyazawa et al. .......... 704/249 |
| 6,233,560 | B1 |   | 5/2001 | Tannenbaum ................ 704/275 |
| 6,714,631 | B1 | * | 3/2004 | Martin et al. ............. 379/88.02 |
| 6,738,462 | B1 | * | 5/2004 | Brunson ................ 379/142.06 |
| 6,922,669 | B2 | * | 7/2005 | Schalk et al. ............... 704/255 |

OTHER PUBLICATIONS

Philips', "*SpeechMania 7.1—Confidence Measurement Transaction User's Guide*" 10 pages. Printed Jul. 11, 2001.
Philips', "*SpeechMania 7.1—Developer's Guide*" 57 pages. Printed Jul. 12, 2001.
Philips', "*SpeechMania 7.1—Documentation Overview*" 10 pages. Printed Jul. 13, 2001.
Philips', "*SpeechMania 7.1—Getting Started*" 23 pages. Printed Jul. 11, 2001.
Philips', "*HDDL—Dialog Description Language, Version 3.0, Reference Guide*" 169 pages. Printed Jul. 11, 2001.
Philips', "*HDDL Dialog Description Language, Version 3.0, User's Guide*" 177 pages. Printed Jun. 11, 2001.
Philips', "*SpeechMania 7.1—Installation Guide*" 61 pages. Printed Jul. 17, 2001.
Philips', "*SpeechMania 7.1—LearnWord Transaction Developer's Guide*" 24 pages. Printed Jun. 11, 2001.
Philips', "*Operation, Administration and Maintenance (OA&M) Center, Version 1.0, Operator's Manual*" 92 pages. Printed Jul. 17, 2001.

(Continued)

*Primary Examiner*—Daniel Abebe
(74) *Attorney, Agent, or Firm*—Baker Botts L.L.P.

(57) ABSTRACT

A method and system for error prevention and recovery of voice activated navigation through a menu having plural nodes provides situation dependent utterance verification by relating confirmation to utterance determination confidence levels. In one embodiment, a high confidence level results in implicit confirmation, a medium confidence level results in explicit confirmation and a low confidence level results in a concise interrogative prompt of a single word that requests the user to repeat the utterance. In situations where voice recognition is difficult, dual modality with DTMF navigation is provided as an option for menu selections.

27 Claims, 3 Drawing Sheets

OTHER PUBLICATIONS

Philips', "*SpeechMania 7.1—Operator's Manual*" 109 pages. Printed Jul. 16, 2001.

Philips', "*SpeechMania 7.1—SpeechAttendant Transaction Developer's Guide*" 20 pages. Printed Jul. 12, 2001.

Philips', "*SpeechMania 7.1 and Toolkit Documentation*" 1 page., no date.

Philips', "*SpeechMania 7.1—Transaction Manual*" 82 pages. Printed Jul. 10, 2001.

Philips', "*SpeechMania 7.1—Transaction Sandbox User's Guide*" 17 pages. Printed Jun. 11, 2001.

Philips', "*SpeechMania 7.1—Transaction Template Compiler, Version 1.5, User's Guide*". 19 pages. Printed May 17, 2001.

Philips', "*SpeechMania Application Creation Environment—Generic Database Transaction, Version 3.0, User's Guide*" 32 pages. Printed May 17, 2001.

The World Wide Web Consortium (W3C), "*Leading the Web to its Full Potential . . .*", at internet address <http://www.w3c.org/> 3 pages. Web page updated Jun. 20, 2002.

The World Wide Web Consortium (W3C), "*Voice Browser" Activity—Voice enabling the Web/*, at internet <http://www.w3c.org/Voice/> 12 pages. Web page updated Jun. 25, 2002.

The World Wide Web Consortium (W3C), "*Voice Extensible Markup Language (VoiceXML) Version 2.0*", at internet address <http://wwww3.org/TR/voicexml20-20020424/> 232 pages. W3C Working Draft Apr. 24, 2002.

Dave Raggett's Introduction to VoiceXML 2.0, "*Getting started with VoiceXML 2.0*", at internet address <http://www.w3c.org/Voice/Guide> 10 pages. Revised Nov. 14, 2001.

The World Wide Web Consortium (W3C), "Speech Recognition Grammar Specification for the W3C Speech Interface Framework", at internet address <http://www.w3c.org/TR/2001/WD-speech-grammar-20010820/> 78 pages. W3C Working Draft Aug. 20, 2001.

The World Wide Web Consortium (W3C), "Semantic Interpretation for Speech Recognition", at internet address <http://www.w3c.org/TR/2001/WD-semantic-interpretation-20011116/>. 52 pages. W3C Working Draft Nov. 16, 2001.

The World Wide Web Consortium (W3C), "Voice Browser Call Control: CCXML Version 1.0", at internet address <http://www.w3c.org/TR/2002/WD-ccxml-20020221/> 48 pages. W3C Working Draft Feb. 21, 2002.

Philips', "*Automatic Speech Recognition—the Technology behind it*" Technical Whitepaper 18 pages. Printed Jan. 19, 2001.

The World Wide Web Consortium (W3C), "Voice Browser Call Control: CCXML Version 1.0", at internet address <http://www.w3c.org/TR/2002/WD-ccxml-20020221/> 48 pages. W3C Working Draft Feb. 21, 2002.

Bruce Balentine and David P. Morgan's "*How to Build a Speech Recognition Application, Second Edition - A Style Guide for Telephony Dialogues*" EIG Press. Printed Dec. 2001.

\* cited by examiner

METHOD AND SYSTEM FOR VOICE RECOGNITION MENU NAVIGATION WITH ERROR PREVENTION AND RECOVERY

TECHNICAL FIELD OF THE INVENTION

The present invention relates in general to the field of voice recognition telephone services, and more specifically relates to a method and system for navigating a voice recognition menu with error prevention and recovery.

DESCRIPTION OF THE RELATED ART

Voice recognition technology has become increasingly popular for providing automated telephonic services through voice activation of menu selections. Voice activation of menu selections, such as for navigation through menu nodes for obtaining and providing information exchanges with automated services, offers a number of advantages over conventional touch tone DTMF signaling. For instance, with mobile phone networks, voice activation allows hands off menu selection for reduced distraction and improved safety of mobile phone use.

One problem that often arises with the use of voice recognition over telephone networks is difficulty in accurately interpreting voice utterances by various users, especially where a user's possible responses may vary. One reason for interpretation difficulty relates to the nature of voice recognition, which compares an utterance from a user with a glossary of possible responses to determine the selection made by the user. Individuals tend to speak with a variety of accents so that a voice recognition system typically must have flexibility to recognize a range of utterance samples. Another reason for interpretation difficulty relates to unpredictable background noise that interferes with an utterance, such as a barking dog, a jack hammer or just a poor connection. The greater the variance of a situation from the situation that a voice recognition system is designed to handle, the greater the likelihood that voice recognition will fail and user utterances will not be recognized.

Failure of voice recognition for a user often creates considerable frustration. For instance, incorrect interpretation of a user utterance may result in navigation of the user to a completely unpredictable menu node. As an example, a user who requests "balance" information for a credit card account would be unhappy indeed if instead the user is transferred to a node about the credit card company's special offer for a "valise." Just as frustrating for a user is the making of repeated failed attempts to obtain recognition of an utterance in which the voice recognition system responds by stating that no match exists for the user's utterance. Although some voice recognition systems permit transfer to an alternative touch tone driven menu, the user typically has to start navigation from the beginning of the menu and is unable to re-select voice activation.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION OF THE INVENTION

Preferred embodiments of the present invention are illustrated in the figures, like numerals being used to refer to like and corresponding parts of the various drawings.

To aid in the prevention of errors for voice activated menu navigation and in the recovery from errors that do occur, the present invention provides situation dependent voice activated navigation that accommodates a range of user preferences and behaviors to aid users in gracefully recovering from recognition or user errors. Thus, users are able to fluidly advance towards objectives in communication with a voice recognition system with reduced time and frustration. To accomplish these goals, in one embodiment, situation dependent utterance verification reduces error likelihood in an unobtrusive manner by applying different levels of verification for utterance interpretations based upon a determined confidence level for each interpretation. In another embodiment, a concise interrogative prompt obtains restatements of utterances having low confidence in a rapid manner and with minimal delay or introduction of confusion for the user. In another embodiment, dual modality provides DTMF signaling functionality, either on a selective basis to overcome difficult nodes or in combination with voice recognition to allow greater user flexibility.

Figure 1:
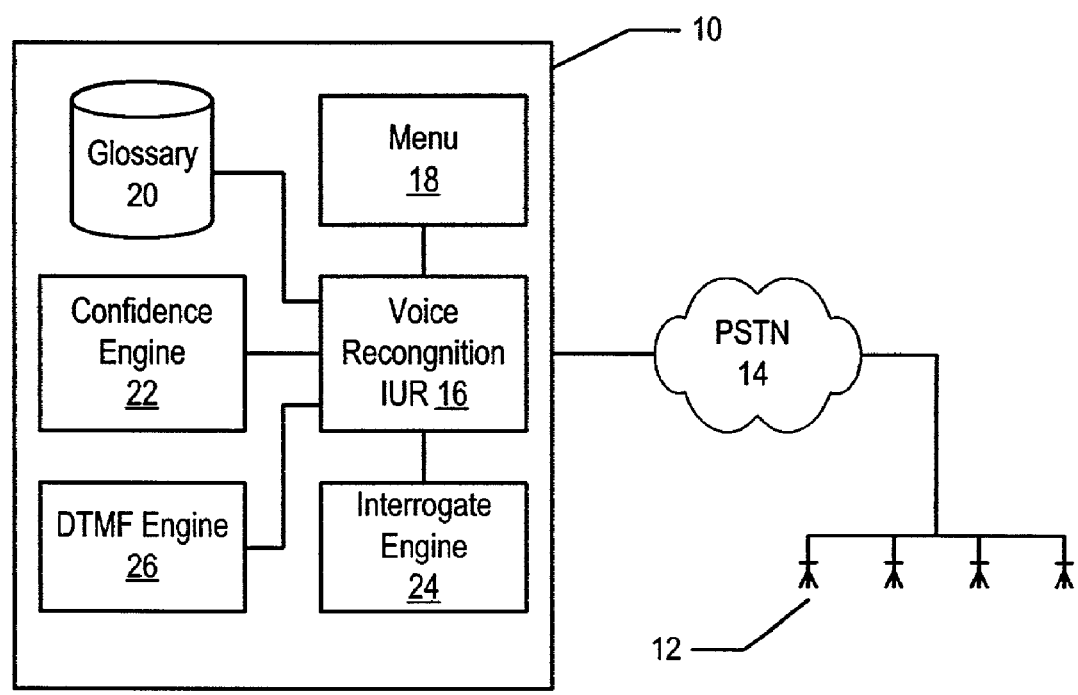
FIG. 1 depicts a block diagram of a system for navigation of a voice recognition menu with error recovery.

Referring now to FIG. 1, a block diagram depicts an error prevention and recovery system 10 for navigation of a voice recognition menu with reduced errors and improved recovery from errors that do occur. Users interface with error prevention and recovery system 10 through telephones 12 and a telephone network 14, such as the public switched telephone network or other telephonic communication systems like voice over internet protocol based systems. A voice recognition interactive voice response unit (IVR) 16 responds to user requests and guides users through a menu 18 having plural nodes for providing services, such as obtaining information from or giving information to users. Voice recognition IVR 16 accepts commands from users that are stated as utterances and converts the utterances into signals for use by a computer system to navigate through menu 18. For example, a mobile phone user may dial a voice activated menu to obtain the user's outstanding balance by stating "balance." Voice recognition IVR 16 compares a digital sample of the user's utterance with sample utterances from a glossary 20 to determine that the user uttered "balance" and advances the user to the balance node of menu 18.

Error prevention and recovery system 10 aids user interaction to improve user experience by accommodating a greater range of user preferences and behaviors and gracefully preventing or recovering from voice recognition and user errors without substantially impeding fluid navigation by users through menu nodes of the voice recognition menu. Errors are prevented from occurring or recovered from after occurrence through the addition of one or more of situation dependent utterances including verification, concise interrogative prompting and dual-mode interaction. Situation dependent utterance verification relates the confidence of utterance recognition to the type of confirming query made by voice recognition IVR 16 to the user. User verification aids in the prevention of errors by confirming utterances in a non-intrusive and fluid manner with confirmation based on recognition confidence levels. As an example, high and medium confidence utterance recognitions result in implicit or explicit confirmations that help prevent errors in those instances where utterance recognition has a high or medium probability of being correct but some chance of error remains. A low confidence utterance recognition with a higher probability of error results in a concise interrogative prompt that succinctly requests the user to re-state the utterance. Dual mode interaction adds touch tone capability to the user's menu selections to recover from errors or to aid a user having apparent difficulty in using the voice recognition menu.

Error recognition and prevention functions are essentially additional interactions made available to a user in response to the level of success of the user in navigation of the menu nodes. User success depends largely on obtaining a high confidence of recognition of user utterances. A confidence engine 22 interfaces with voice recognition IVR 16 and determines the confidence level associated with a user utterance recognition. For instance, recognition confidence may be measured as high, medium or low based upon the likelihood that voice recognition IVR 16 correctly correlated a user utterance to an utterance of glossary 20. The confidence level classification may vary dependent upon the menu node, the complexity of the recognition and the effectiveness of the various error and prevention options at the menu node accessed by the user. For instance, in some situations an utterance recognition with a 95% likelihood of being correct will result in a confidence level classification of high while in other situations the same likelihood will result in a medium confidence level. In one embodiment, the assignment of confidence levels may be configured based on user experience or experimentation to support the most efficient user navigation and best possible level of service for improved user satisfaction.

Confidence engine 22 provides confidence levels to voice recognition IVR 16 to support adaptation of the interaction with the user for error prevention and recovery. Voice recognition IVR 16 interfaces with an interrogate engine 24 and a DTMF engine 26 to alter user interaction as appropriate for the detected confidence level. For instance, if confidence engine 22 determines a high confidence level for an utterance, interrogate engine 24 provides voice recognition IVR 16 with an implicit confirmation and ensures that implicit confirmation is received before voice recognition IVR 16 proceeds to the menu node associated with the determined user utterance. If confidence engine 22 determines a medium confidence level for an utterance, interrogate engine 24 provides voice recognition IVR 16 with an explicit confirmation and ensures that explicit confirmation is received before voice recognition IVR 16 proceeds to the menu node associated with the determined user utterance. If confidence engine 22 determines a low confidence level for an utterance, interrogate engine 24 provides voice recognition IVR 16 with an concise interrogative prompt to have the user re-state the utterance with as little delay and confusion as possible, such as simply stating "Pardon?" as a query. In alternative embodiments, additional confidence levels and associated situation dependent verifications may be used.

In some instances, such as with a low confidence level, with repeated difficulty determining a particular user's utterances, or with delays in user utterances indicating discomfort with voice recognition technology, interrogate engine 24 instructs voice recognition IVR 16 to call DTMF engine 26. DTMF engine 26 requests information from users as either an utterance or as a DTMF tone selected by pressing a number from the user's telephone number pad. For instance, a user with a poor connection or with a strong accent may have difficulty navigating through voice utterance recognition. Calling DTMF engine 26 inserts an instruction for the user to choose either a voice utterance input or a DTMF input. This allows a user to recover the navigation process from the current node rather than re-initiating the navigation process with a separate DTMF system. As an example, if a user hesitates for a predetermined period of time to a request for an utterance input, DTMF engine 26 prompts voice recognition IVR 16 to repeat the request along with DTMF instructions associated with likely menu nodes. Alternatively, if voice recognition IVR 16 fails to recognize an utterance within a predetermined number of attempts, DTMF engine 16 provides a set of DTMF responses to proceed with navigation from the current node.

Figure 2:
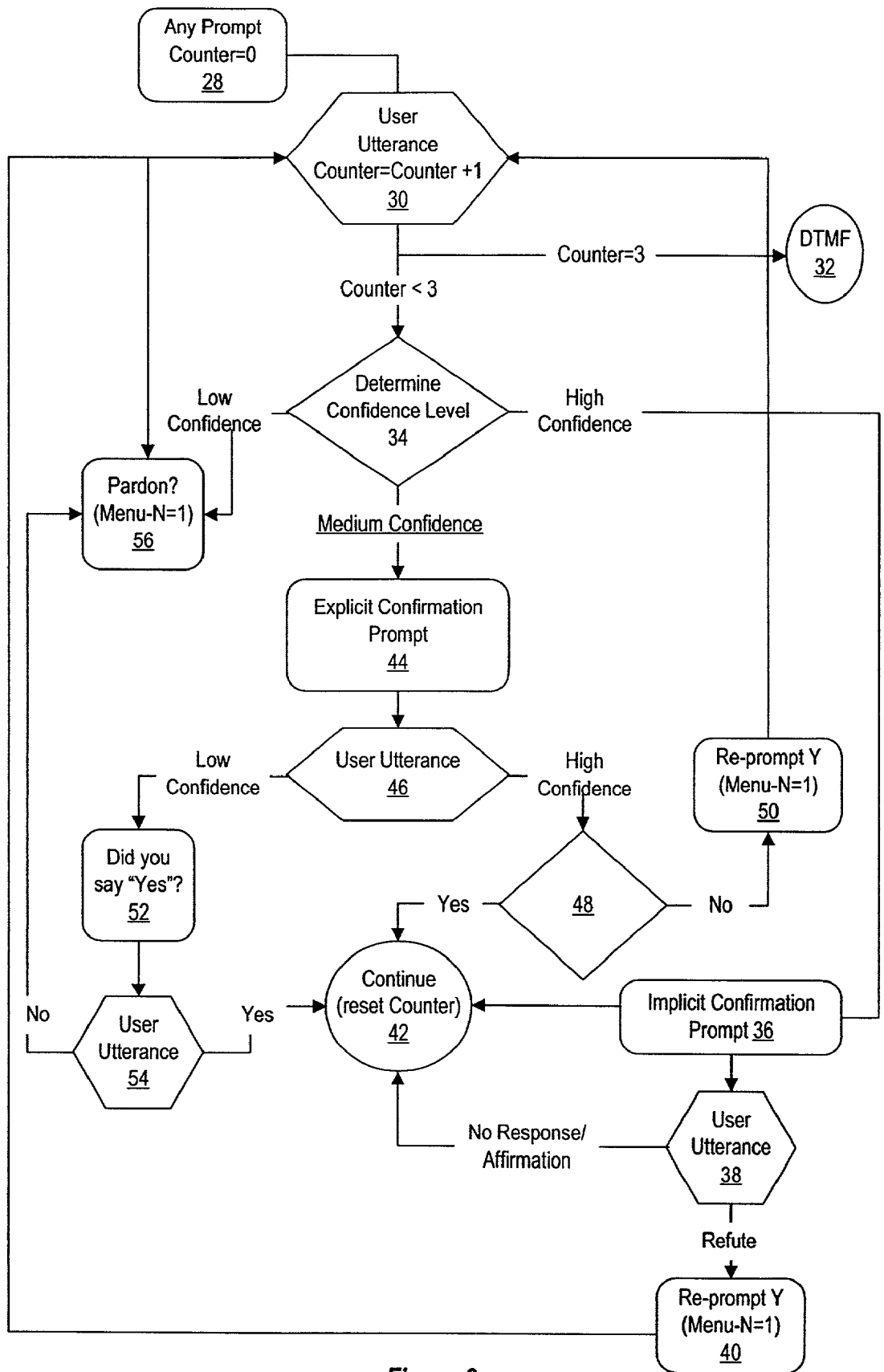
FIG. 2 depicts a flow diagram of a process for navigation of a voice recognition menu with error recovery.

Referring now to FIG. 2, a flow diagram depicts a process of navigation of a voice recognition menu with error prevention and recovery. The process begins at step 28 with any prompt of a menu. For instance, when a user first calls into voice recognition IVR 16 the user is generally greeted at a main menu node and requested to state an utterance for his inquiry. Thereafter, the user navigates through menu nodes with each node providing a prompt for continued navigation. As an example, a user greeted at initial contact with a main menu node prompt asking for the user's inquiry states the utterance "balance" to obtain account balance information. Voice recognition IVR 16 proceeds to a balance menu node prompt for the user's account information. After the user is given the balance information, an additional prompt requests the user to utter another menu node of interest. For each such prompt, the error prevention and recovery process may be initiated.

The process proceeds to step 30 at which voice recognition IVR 16 receives the user's utterance in response to the prompt of step 28 and sets a counter to 1. The counter tracks the attempts by the user to state the utterance. In the embodiment depicted by FIG. 2, a count of 3 results in the process proceeding to step 32 for initiation of DTMF engine 26. In one embodiment, undue delay by the user in making an utterance advances the counter to 3 to proceed to step 32, such as a hesitation by the user of 3 seconds in responding to the prompt. DTMF engine may proceed with a DTMF only menu or a combined DTMF and voice recognition menu dependent upon the current menu node and the reason for the count reaching 3. For instance if a user has difficulty with a particular utterance, DTMF engine 26 will allow the user to continue attempts at voice recognition navigation for other utterances. If, on the other hand, the user fails to respond with an utterance to a voice prompt, then DTMF engine may proceed with a DTMF only engine.

If the count of attempts is less than 3 or another predetermined number of attempts, the process proceeds to step 34 for a determination of the confidence level of the voice recognition. For instance, a high confidence level is assigned to recognitions that closely match an entry of glossary 20, a medium confidence is assigned to recognitions that match an entry of glossary 20 but with a lesser degree of certainty, and a low confidence is assigned to recognitions that are uncertain, that match more than one glossary entry or that fail to match any glossary entry. The assignment of confidence levels based on recognition probability may vary from menu node to menu node. For instance, some menu nodes may have a relatively simple glossary of utterance responses, like yes or no, where a high confidence of voice recognition is more easily achieved. Other menu nodes may have more complex glossaries, such as naming a company to obtain a stock quote, where a high confidence is more difficult and time spend obtaining confirmation is more acceptable. Confidence engine 22 takes into account the complexity of voice recognition performed for a given node to apply confidence levels so that efficient and fluid navigation through nodes is achieved. Assignment of confidence levels for a particular node and utterance recognition probability may be developed based on user experience and satisfaction so that verification is presented in a manner that ultimately reduces the time needed for users to successfully navigate through a menu.

If the determination at step 34 is a high confidence level, the process proceeds to step 36 at which an implicit confirmation prompt is provided to the user. Implicit verification confirms utterance recognition by repeating the key information back to the user, perhaps with an inflection to imply a query, and briefly pausing in the menu dialogue for a user input. For instance, a user may respond by confirming the utterance recognition, by refuting the utterance recognition or by failing to respond thus implying confirmation of the utterance recognition. For high confidence levels, implicit confirmation allows a user to choose to reply if correction is needed or to not reply to imply correct recognition without substantially slowing menu navigation. Thus, at step 38 voice recognition IVR 16 waits for a predetermined time to obtain a user response to the implicit confirmation. If the user refutes the implicit verification, then at step 40, the user is returned to step 30 for re-prompt with the counter added to by 1. If the user fails to respond or affirms the recognition, the process proceeds to step 42 at which the user is forward to the menu node associated with the recognized utterance. As a specific example, if the prompt at step 28 is for a company name to obtain a stock quote and voice recognition IVR 16 detects a user utterance of "SBC," then the implicit confirmation might be a statement or query of "Obtaining the quote for SBC." The user confirms recognition of the utterance as SBC either by an explicit affirmation with a "yes" or implicit affirmation of silence. Alternatively, the user refutes-the voice recognition, such as with a "no" resulting a return to the original prompt for a re-attempt of the utterance.

If the confidence level determination at step 34 is a medium confidence, the process proceeds to step 44 for explicit confirmation. Explicit verification prompts the user to either confirm or refute a given interpretation of the user's utterance by making clear to the user that either an affirmation or refutation is needed before navigation through the menu is continued. Explicit confirmation slows navigation progress to a greater degree than does implicit confirmation but may ultimately save time in those instances where interpretation of the user's utterance was not correct. Thus, by associating explicit confirmation with medium confidence levels, the navigation through the menu by the user is slowed only in those instances where a high enough probability of an incorrect interpretation exists. Explicit confirmation may slow navigation in cases where interpretation was correct, but still results in time savings compared with having the user re-state the utterance as opposed to stating an affirmation or refutation, like "yes" or "no," which are generally easier to interpret.

As an example of explicit confirmation at step 44, if the user utterance was for a stock quote for SBC with the interpretation of SBC having a medium confidence level, then at step 44 voice recognition IVR 16 will query the user by stating "Do you want a quote for SBC?" The query requires a response from a limited glossary of affirmations or refutations that are more easily interpreted. Thus, at step 46 the user might affirm the interpretation of SBC by stating "That's right" or "Yes," or might refute the interpretation by stating "That's wrong" or "No." If voice recognition IVR 16 is able to obtain a high confidence affirmation or refutation, the process proceeds to step 48 for determination of whether the user affirmed or refuted the interpretation. If the user affirmed the interpretation, the process proceeds to step 42 for navigation to the selected node associated with the utterance. If the user refutes the interpretation, the process proceeds to step 50 for a restatement of the utterance and incrementing of the counter by 1 and then to step 30 for another attempt to interpret the utterance. If the user's affirmation or refutation has a low confidence level, the process proceeds to step 52 for a prompt of explicit confirmation of the affirmation or refutation, such as by a query of "Did you say yes?" At step 54, the user utters an affirmation to continue through menu navigation at step 42 or a refutation resulting in a request by the system for another utterance attempt at step 50.

If the confidence level determination at step 34 is a low confidence determination, then the process proceeds to step 56 to request a restatement of the utterance by the user. At step 56, a concise interrogative prompt is commanded to request the user to repeat the utterance and the process proceeds to step 30 to accept the re-stated utterance from the user with the counter incremented by one. The re-prompt at step 56 is constructed to ensure proper behavior by the user in repeating the utterance and pursuing as smooth a progression as possible through the call flow with as little delay as possible. A concise interrogative prompt is a query of a single word conveyed as a question, such as stating "Pardon?" Since the concise interrogative prompt immediately follows the user's utterance, the natural user behavior is to re-state the utterance more clearly. The use of a single-word prompt minimizes delay and avoids user confusion.

Figure 3:
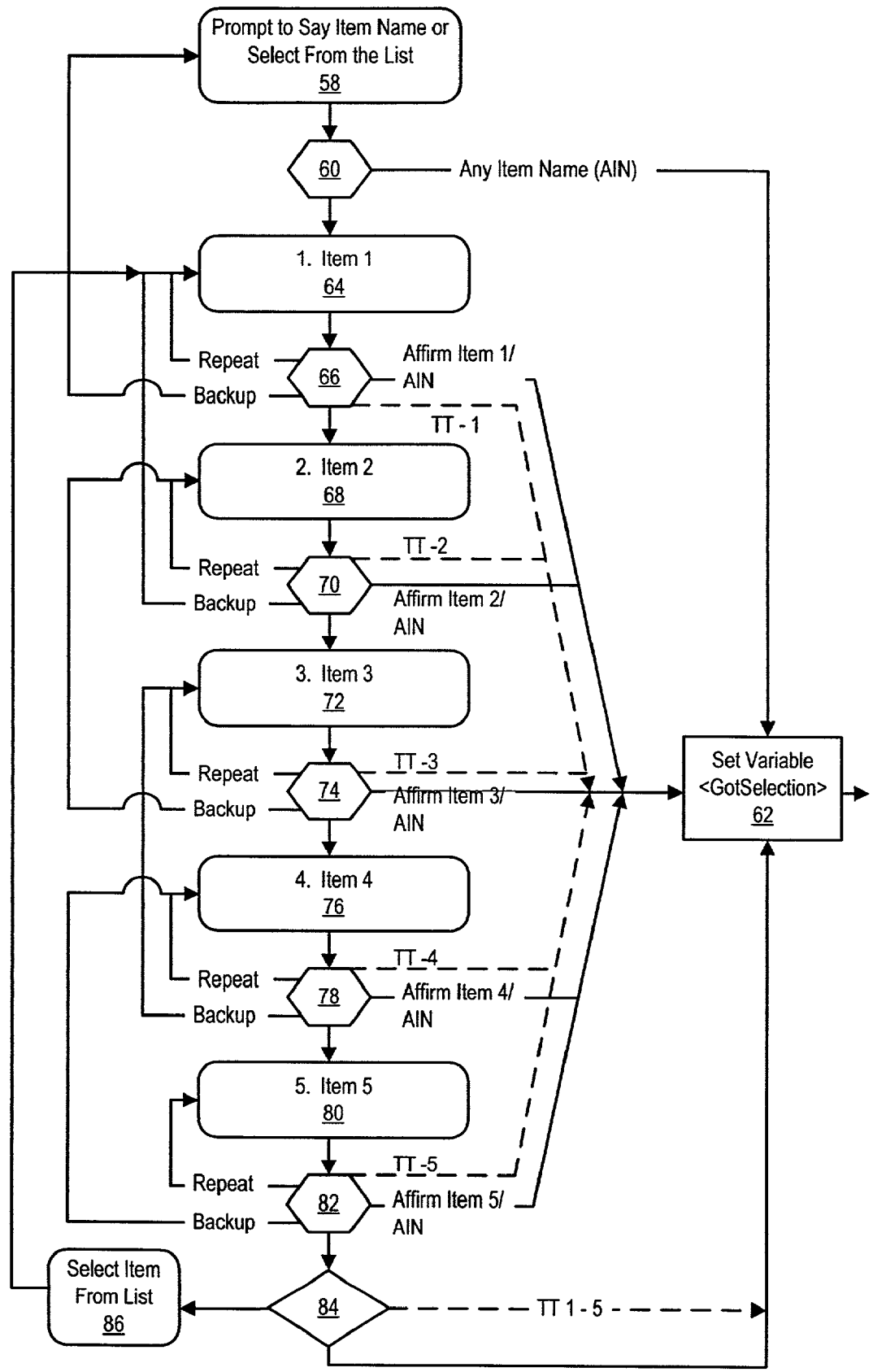
FIG. 3 depicts a flow diagram of a process for dual modality navigation of a voice recognition menu with utterance and touch tone inputs.

Referring now to FIG. 3, a flow diagram depicts a process of dual modality navigation of a voice recognition menu with utterance and touch tone inputs. For instance, a user having difficulty navigating a menu with voice activation is directed from step 32 of FIG. 2 to step 58 of FIG. 3 and given a prompt with an option to either state an utterance or to select a DTMF number in order to make a selection. In an alternative embodiment, DTMF processing is available at all times. For example, the prompt would state: "What service would you like to hear about? You have four choices: One—Call waiting; Two—Caller ID; Three—Voice Mail; Four—Privacy Manager. The user has the option to either use touch-tone (by pressing 1 through 4) or speech (by saying a service name). If the user knows the name of the system they want they could say it right away without hearing the menu options. Otherwise the user listens to each menu item and either responds after listening to all of them or "barge-in" as the menu list is being played and make a selection.

At step 60, voice recognition IVR 16 pauses to interpret any item name utterance from the user. If an utterance is made that matches an utterance variable or a DTMF variable, the process proceeds to step 62 to find the node associated with the interpreted utterance. If a recognizable utterance is not interpreted at step 60, the process proceeds through steps 64 to 82 to list the menu items and accept a user input. For instance, at step 64, item 1 from the menu is listed along with a touch tone for the selection of item 1. As an example, if item 1 is a balance inquiry, the user is instructed to either state "balance" or select the number 1 from his keypad. At step 66, a pause allows the user to select an input. If an input is made, explicit or implicit confirmation may be requested. If no input is made, the process proceeds to the next item until the user selects an item or the list of items is exhausted. After exhaustion of the item list, at step 84 a pause occurs to allow selection of any item name. If an item is selected, the process proceeds to the selected menu node at step 62. If no selection is made, the process proceeds to step 86 to re-prompt the user to select an item and the list of items is repeated from step 64.

The steps depicted by FIG. 3 may be initiated when a user runs into difficulty or may be included at each menu node as part of the menu 18. When the user responds to a menu item, the system determines if the response was DTMF or speech, as depicted at steps 60, 66, 70, 74, 78 and 82. If the response was touch tone, it is handled by the DTMF engine 26. If the response is speech, it is handled by voice recognition IVR 16 as depicted in FIG. 2 at step 30. If the speech response is analyzed in terms of confidence scores and verified at step 42, a value is assigned to the GotSelection variable at step 62 of FIG. 3. For example, if a user states "Caller ID", the value may be Item 2 of FIG. 3. This variable determines the node to proceed to next. For example, if GotSelection='Item 2', then voice recognition IVR plays menu options for Caller ID. If the response is DTMF, it is analyzed by DTMF engine 26 and a value is assigned to the GotSelection Variable at step 62. For example, if the person pressed '2' the variable value would be Item 2. Again, this variable is used by the system to proceed to the next appropriate system node. If voice recognition IVR 16 fails to return a valid utterance, such as when confirmation is not obtained within 3 attempts, then the system tells the user there is a problem and defaults to accepting DTMF only. The prompts change to better suit DTMF input (e.g., for Call waiting, press 1; for Caller ID, press 2 . . . ). Alternatively, the user is transferred to a customer service representative after 3 failed attempts.

Dual modality of both touch tone and voice recognition inputs enhances user satisfaction in situations where users lack familiarity with voice recognition or where the use of touch tone is inappropriate or unsafe, such as when driving a car. In one embodiment, the user is can navigate using only voice recognition or only touch tone interaction or with both modalities. For instance, a prompt informs the user of the availability of voice recognition and asks the user to either state the purpose of the call or select a touch tone. In an alternative embodiment, a touch tone interface is made available on a selective basis at nodes that the user has particular difficulty in navigating. Thus, a touch tone menu is available to accommodate that user preference or to aid in difficult environments, such as with complex menu choices, excessive background noise or a poor telephone connection.

Although the present invention has been described in detail, it should be understood that various changes, substitutions and alterations can be made hereto without departing from the spirit and scope of the invention as defined by the appended claims.

What is claimed is:

1. A method for navigating a voice recognition menu having plural nodes, the method comprising:
   receiving a user utterance at a voice recognition service;
   determining a requested node associated with the user utterance;
   classifying the user utterance as having a high, medium or low confidence that the determined requested node matches the node requested by the user utterance;
   advancing a high confidence utterance to a menu node associated with the high confidence utterance;
   requesting confirmation of a medium confidence utterance by prompting the user with the determined requested node;
   requesting the user to restate a low confidence utterances;
   counting the number of attempts to determine the received user utterance; and
   automatically directing the user to a DTMF menu after a predetermined number of attempts.

2. The method of claim 1 further comprising:
   obtaining implicit confirmation of high confidence utterances before advancing to associated menu nodes.

3. The method of claim 2 wherein obtaining implicit confirmation further comprises:
   stating the determined requested node;
   advancing to the determined requested node if the user either fails to respond; and
   requesting the user to restate the user utterance if the user refutes the determined requested node.

4. The method of claim 1 wherein requesting confirmation of a medium confidence utterance further comprises:
   obtaining explicit confirmation of medium confidence utterances.

5. The method of claim 4 wherein obtaining explicit confirmation further comprises:
   stating the determined requested node as query to the user;
   advancing to the determined requested node if the user responds with affirmation; and
   requesting the user to restate the user utterance if the user refutes the determined requested node.

6. The method of claim 1 wherein requesting the user to restate a low confidence utterance further comprises:
   stating a precise interrogative prompt; and
   re-receiving the user utterance from the user.

7. The method of claim 6 wherein the precise interrogative prompt comprises a single word stated as a query.

8. The method of claim 7 wherein stating the precise interrogative prompt comprises stating the word "Pardon" as a query.

9. The method of claim 1, wherein:
   the received user utterance is associated with a particular one of the plural nodes; and
   different ones of the plural nodes have different quantitative confidence level ranges such that the classification of the user utterance as a high, medium or low confidence utterance is based at least in part on the quantitative confidence level ranges corresponding with the particular node.

10. The method of claim 1, wherein each node of the voice recognition menu has a prompt requesting information from the user.

11. A system for aiding user navigation through a voice recognition menu having plural nodes, the system comprising:
   a voice recognition response unit interfaced with a telephone network, the voice recognition response unit operable to accept a user request for a menu node submitted as a voice utterance and determine the node of the voice recognition menu associated with the voice utterance;
   a confidence engine interfaced with the voice recognition response unit and operable to assign one of plural confidence levels to the determination by the voice recognition response unit of the node associated with the voice utterance;
   an interrogate engine interfaced with the voice recognition response unit and operable to command an implicit confirmation for a first confidence level, an explicit confirmation for a second confidence level and a concise interrogative prompt for a third confidence levels; and a DTMF engine interfaced with the voice recognition response unit, the DTMF engine operable to provide a touch tone menu for selection of a requested node;

wherein the voice recognition response unit further comprises a counter to count user attempts to navigate to a particular node, the counter activating the DTMF engine to provide touch tone navigation after a predetermined number of attempts.

12. The system of claim 11 wherein the implicit confirmation comprises stating the determined node to the user and proceeding to the determined node unless the user refutes the determined node.

13. The system of claim 12 wherein the implicit confirmation further comprises stating the determined node as a query.

14. The system of claim 11 wherein the explicit confirmation comprises stating the determined node to the user as a query requiring an affirmative response before proceeding to the determined node.

15. The system of claim 14 wherein the explicit confirmation further comprises instructions to restate the requested node if the user refutes the determined node.

16. The system of claim 11 wherein the concise interrogative prompt comprises a single word query to restate the requested node.

17. The system of claim 11 wherein the voice recognition response unit detects a predetermined delay by users in responding to requests for input, the voice recognition response unit operable after the predetermined delay to provide a secondary request for input, the secondary request including instructions to input a DTMF response to navigate to a node.

18. The system of claim 11 wherein the DTMF engine selectively activates to offer touch tone menu options in conjunction with voice activated menu options.

19. The system of claim 11, wherein:
the received voice utterance is associated with a particular one of the plural nodes; and
different ones of the plural nodes have different quantitative confidence level parameters such that the assignment of a confidence level to the determination of the node associated with the voice utterance is based at least in part on the quantitative confidence level parameters corresponding with the particular node.

20. A method for voice activated navigation of a menu, the method comprising:
receiving a voice request to navigate to a menu selection;
determining the menu selection by comparing the voice request to a glossary of sample requests;
determining a confidence level for the menu selection determination;
selectively confirming the menu selection determination based on the confidence level;
counting user attempts to state a menu selection; and
automatically providing a DTMF menu to the user after a predetermined number of attempts.

21. The method of claim 20 wherein selectively confirming comprises one of implicit confirmation or explicit confirmation.

22. The method of claim 20 further comprising re-prompting the voice request if the user refutes the menu selection determination.

23. The method of claim 20 wherein determining a confidence level further comprises determining a high, medium or low confidence level, the method further comprising:
querying the user with a concise interrogative prompt for low confidence menu selection determinations.

24. The method of claim 23 wherein the concise interrogative prompt comprises a query having a single word.

25. The method of claim 24 wherein the concise interrogative prompt comprises the query "Pardon?"

26. The method of claim 20 wherein providing a DTMF menu further comprises offering the user selection by either voice activation or a touch tone input.

27. The method of claim 20, wherein:
the menu includes multiple nodes;
the received voice request is associated with a particular one of the multiple nodes; and
different ones of the multiple nodes have different quantitative confidence level parameters such that the determination of the confidence level for the menu selection determination is based at least in part on the quantitative confidence level parameters corresponding with the particular node.

* * * * *